US007305563B2

(12) United States Patent
Bacchiaz et al.

(10) Patent No.: US 7,305,563 B2
(45) Date of Patent: Dec. 4, 2007

(54) BIOMETRIC SECURITY ASSEMBLY

(75) Inventors: John David Bacchiaz, Queensland (AU); David Brunell, West Palm Beach, FL (US)

(73) Assignee: Mu Hua Investment Limited, Hong Kong (HK)

( * ) Notice: Subject to any disclaimer, the term of this patent is extended or adjusted under 35 U.S.C. 154(b) by 0 days.

(21) Appl. No.: 11/084,367

(22) Filed: Mar. 18, 2005

(65) Prior Publication Data

US 2005/0182947 A1 Aug. 18, 2005

(30) Foreign Application Priority Data

Oct. 13, 2004 (AU) .............................. 2004218720

(51) Int. Cl.
*G06F 7/40* (2006.01)
*G06F 7/20* (2006.01)

(52) U.S. Cl. .......................... 713/186; 726/20; 726/19; 726/7; 726/9; 340/5.52; 340/5.82; 902/3

(58) Field of Classification Search .................... 439/1, 439/53; 713/186
See application file for complete search history.

(56) References Cited

U.S. PATENT DOCUMENTS 4,868,409 A 9/1989 Tanaka et al.
5,055,658 A * 10/1991 Cockburn .................. 235/382
5,337,588 A 8/1994 Chhatwal
5,592,169 A * 1/1997 Nakamura et al. .......... 341/173
6,078,265 A * 6/2000 Bonder et al. ............. 340/5.23
7,054,470 B2 * 5/2006 Bolle et al. ................. 382/124
2002/0059523 A1 * 5/2002 Bacchiaz et al. ........... 713/200
2005/0077995 A1 * 4/2005 Paulsen et al. .............. 340/5.6
2006/0120573 A1 * 6/2006 Iori ............................ 382/124

FOREIGN PATENT DOCUMENTS

AU 757159 11/2001
EP 1 157 906 A2 11/2001

* cited by examiner

*Primary Examiner*—Christopher Revak
*Assistant Examiner*—Saoussen Besrour
(74) *Attorney, Agent, or Firm*—Akerman Senterfitt

(57) ABSTRACT

A biometric key (10) having a body or housing (11) incorporating a biometric sensor (17) uses a plurality of contacts (19, 20, 21) enabling the key to gain access to a facility. There is also provided a receptor (25) for receiving the biometric key (10), wherein the biometric key (10) and receptor (24) have contacts (19, 20, 21) and mating contacts (30, 31, 32), respectively, for communicating. The biometric key (10) can communicate biometric data acquired from a key operator to the receptor (25). The biometric key (10) can communicate with the receptor (25) when received in a first orientation and also when received in a second orientation where the contacts (19, 20, 21) are inverted from the first orientation.

10 Claims, 5 Drawing Sheets

BIOMETRIC SECURITY ASSEMBLY

FIELD OF THE INVENTION

This invention relates to a biometric security assembly for providing access to a facility.

BACKGROUND TO THE INVENTION

Security systems are relied upon to secure environments and possessions such as cars, homes, businesses and prisons. Keys and locks are integral to most security systems but unfortunately, keys can be lost or duplicated and a security system can then be breached.

Electronic or electrically activated security assemblies often require a battery for their power source and this can be disadvantageous in that batteries require constant replacement and this increases maintenance costs.

To overcome the disadvantages of conventional lock and key systems as described above a conventional biometric security assembly has been developed that reads biometric data from an operator in order to verify the operator's identity.

A biometric security assembly which includes a biometric key and lock for engagement with the key is described in Australian Patent 757159. The biometric key is provided with a sensor as well as one or more electrical contacts that touch a mating contact(s) of the lock in use so that a signal representing a biocode of data in regard to the user of the biometric key is sent to processing means incorporated in the lock. Upon matching of the signal with an authorised biocode in a database associated with the processing means the lock may be opened to provide access to a facility.

While the abovementioned conventional biometric security assembly is satisfactory in use it is possible for this security assembly and other conventional security systems which utilise an electrical connection between the lock and the key to have problems in maintaining polarity of the electrical connection and with shorting of the electrical contacts to ground or each other while the key is being inserted in the lock. This problem has been addressed to some extent for example in U.S. Pat. No. 5,337,588 by allowing insertion of the key in only one orientation which limits its utility and through elaborate electromechanical means to ensure that the contacts do not short out, which increases the cost of manufacture.

OBJECT OF THE INVENTION

It is therefore an object of the invention to overcome or reduce one or more problems associated with the prior art.

SUMMARY OF THE INVENTION

The invention therefore provides a biometric key comprising a housing and a biometric sensor, a key circuit, and a plurality of electrical contacts connected to the housing wherein:

the key circuit incorporates a power supply circuit and a communications circuit;

at least two of the plurality of contacts are in electrical communication with the power supply circuit;

the communications circuit is in electrical communication with at least two of the plurality of contacts; and at least two of the plurality of contacts can transmit and receive data, enabling the key to be received in a receptor in either of two configurations to provide access to a facility.

Preferably, the sensor reads biometric data from a key operator.

Preferably, at least two of the plurality of contacts are attached to diode circuits, where a first contact is connected to an anode of a first diode and to a cathode of a second diode, and a power supply is connected to a cathode of the first diode and the communications circuit is connected to an anode of the second diode.

Preferably, the key incorporates a microprocessor.

Preferably, the key has three contacts.

Preferably, the communications circuit comprises an arrangement of a plurality of 2-input nand gates and a switch, wherein communication data is electrically communicated to both inputs of a first nand gate, an output of the first nand gate is electrically connected to an input of a second nand gate, both inputs of a third nand gate are electrically connected to a second input of the second nand gate, the output of the second nand gate provides a received data signal and a transmitted data signal is provided to both inputs of the third nand gate.

Preferably, the receptor has a plurality of mating contacts.

Preferably, the receptor has three mating contacts.

Preferably, both the contacts of the key and the mating contacts of the receptor can transmit and receive data.

Preferably, the receptor incorporates a receptor circuit that incorporates a power supply and a communications circuit.

Preferably, the receptor incorporates a microprocessor.

Preferably, the receptor incorporates a first resistor such that the resistor limits the power supply to supply only power levels that will not damage the receptor circuit or the key circuit.

Preferably, the receptor incorporates a second resistor such that the resistor provides short circuit protection for the key circuit and/or the receptor circuit.

Preferably, the communications circuit comprises an arrangement of a plurality of 2-input nand gates and a switch, wherein communication data is electrically communicated to both inputs of a first nand gate, an output of the first nand gate is electrically connected to an input of a second nand gate, both inputs of a third nand gate are electrically connected to a second input of the second nand gate, the output of the second nand gate provides a received data signal and a transmitted data signal is provided to both inputs of the third nand gate.

In another form, the invention resides in a method for repeatedly opening a lock that prevents access to a facility, which method includes the steps of:

(i) inserting a biometric key comprising a biometric sensor into a receptor in a first configuration such that a plurality of key contacts are electrically connected to mating receptor contacts;

(ii) communicating data relating to the identity of a key operator from the sensor to the receptor via the key;

(iii) opening the lock a first time upon verification of the identity of the key operator;

(iv) inserting the biometric key comprising the biometric sensor into the receptor in a second configuration such that the plurality of key contacts are inverted from the first configuration and are electrically connected to the mating receptor contacts;

(v) communicating data relating to the identity of the key operator from the sensor to the receptor via the key; and (vi) opening the lock a second time upon verification of the identity of the operator of the biometric key.

BRIEF DESCRIPTION OF THE DRAWINGS

Preferred embodiments of the invention are shown in the attached drawings wherein.

DETAILED DESCRIPTION OF THE INVENTION

Figure 1:
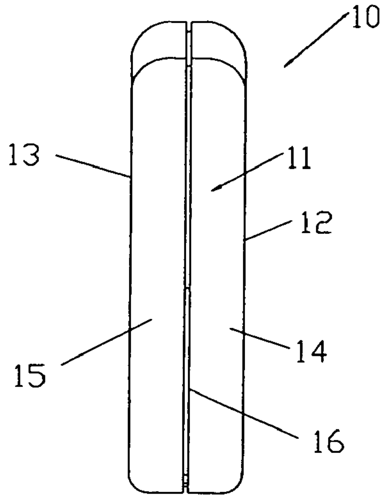
FIGS. 1 to 4 show a side, top, plan, end and perspective view of the biometric key of the invention.
Figure 2:
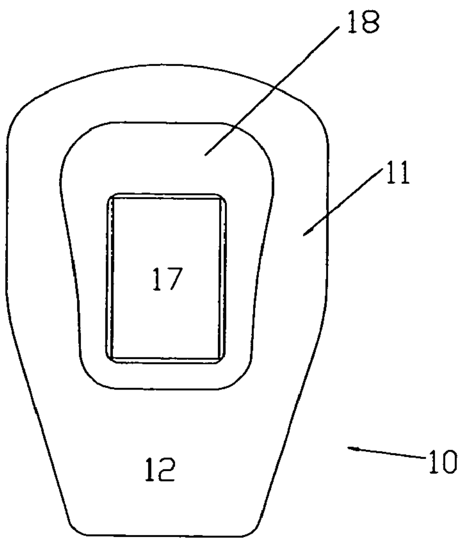

In the drawings in FIGS. 1 to 2 there is shown biometric key 10 having a body 11 having a front surface 12 and a rear surface 13. There is also shown a top component 14 in use and lower component 15 in use which are both attached to each other at a point 16. The front surface 12 includes a sensor 17 surrounded by a recess 18.

Figure 3:
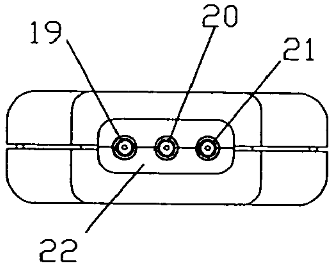
Figure 4:
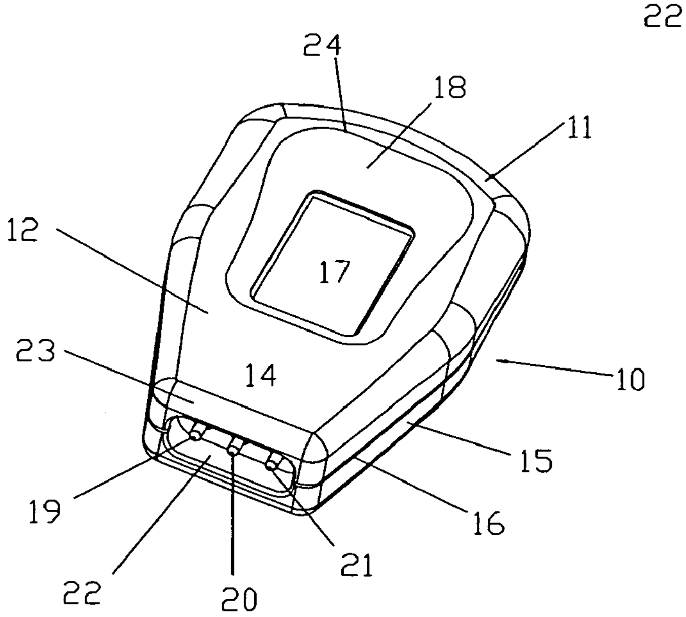

In FIGS. 3 to 4 there is shown contact pins 19, 20 and 21 located in cavity 22 located at one end 23 of key 10 which is narrower in width than the other end 24.

Figure 5:
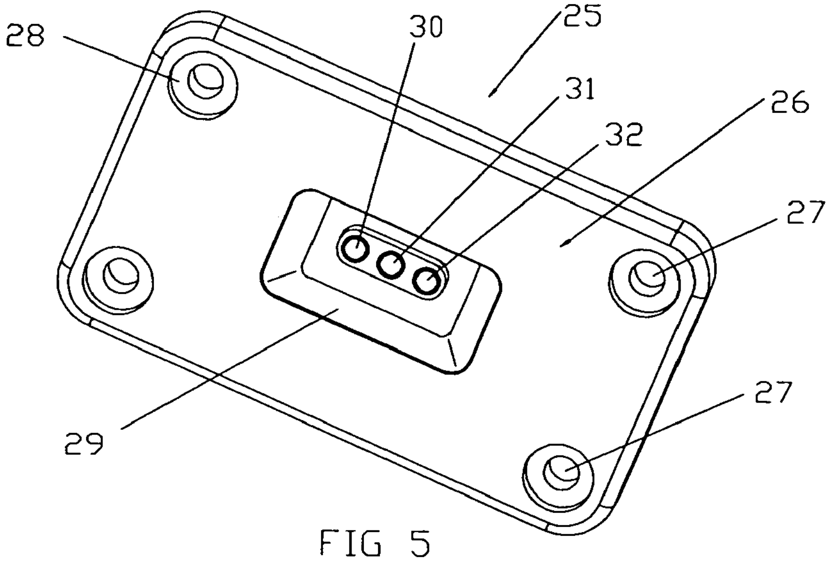
FIGS. 5 to 7 are a perspective, side and top plan view of the door controller receptor of the invention.
Figure 6:
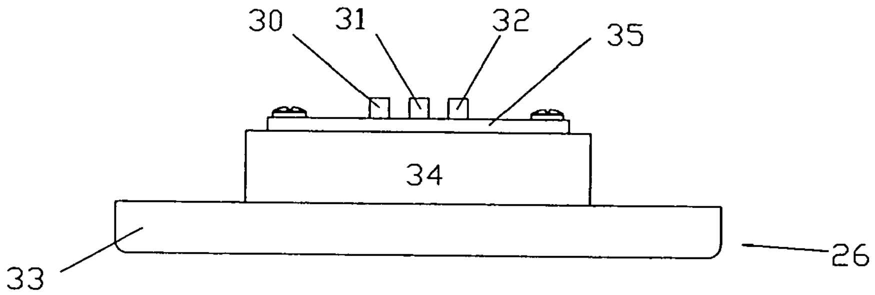
Figure 7:
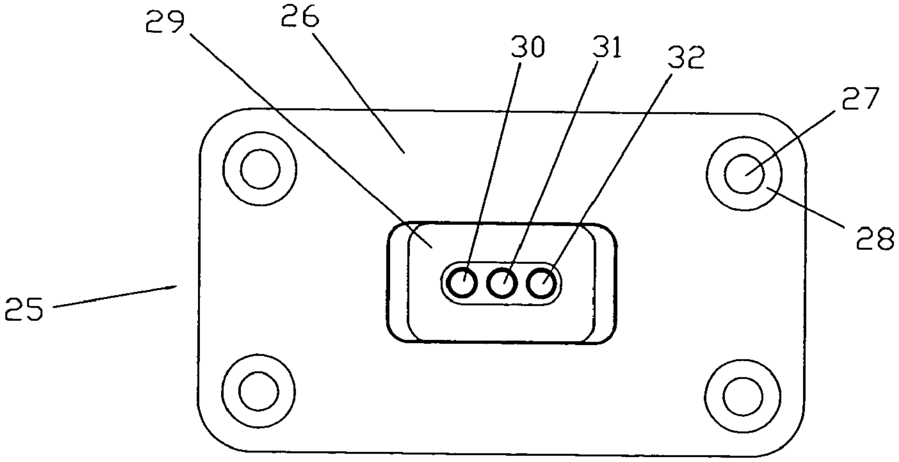

In FIGS. 5 to 7 there is shown door controller receptor 25 having a plate like body 26 and attachment apertures 27 for attachment to a door (not shown). There is also shown recesses 28 for the head (not shown) of fasteners (not shown). The door controller receptor 25 is provided with a central hollow 29 and there are also provided stationary contacts 30, 31 and 32 which abut each spring loaded pins 19, 20 and 21 in use. Body 26 includes an attachment part 33 and an adjacent part 34 surrounding central hollow 29. Part 34 also has contacts 30, 31 and 32 extending outwardly therefrom as well as support part 35 for contacts 30, 31 and 32.

Figure 8:
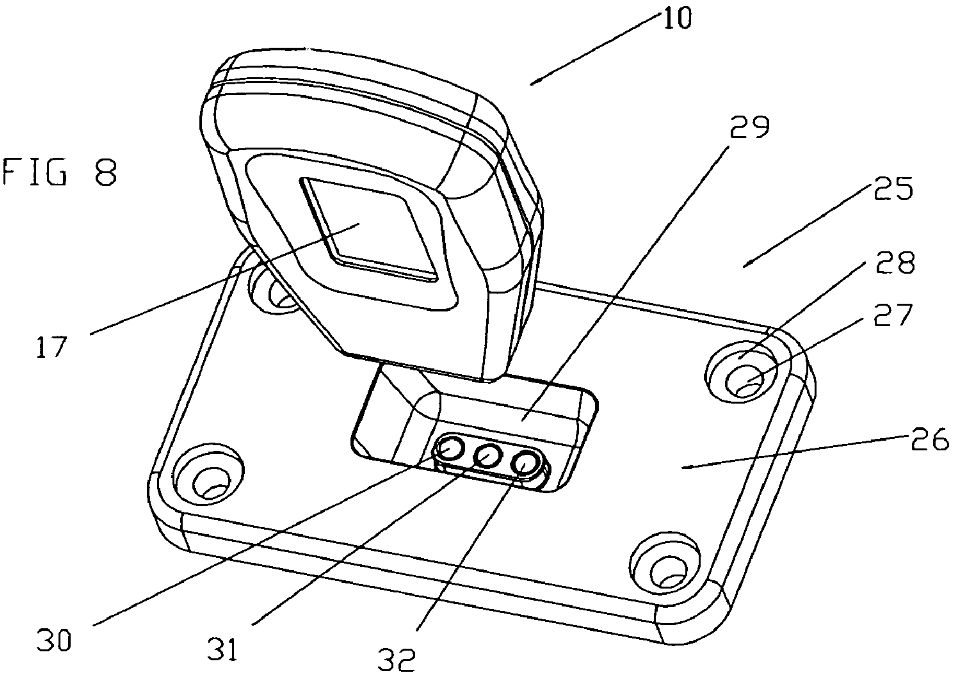
FIGS. 8 and 9 show a perspective view and a partial sectional view of the key and the door controller prior to engagement with each other.
Figure 9:
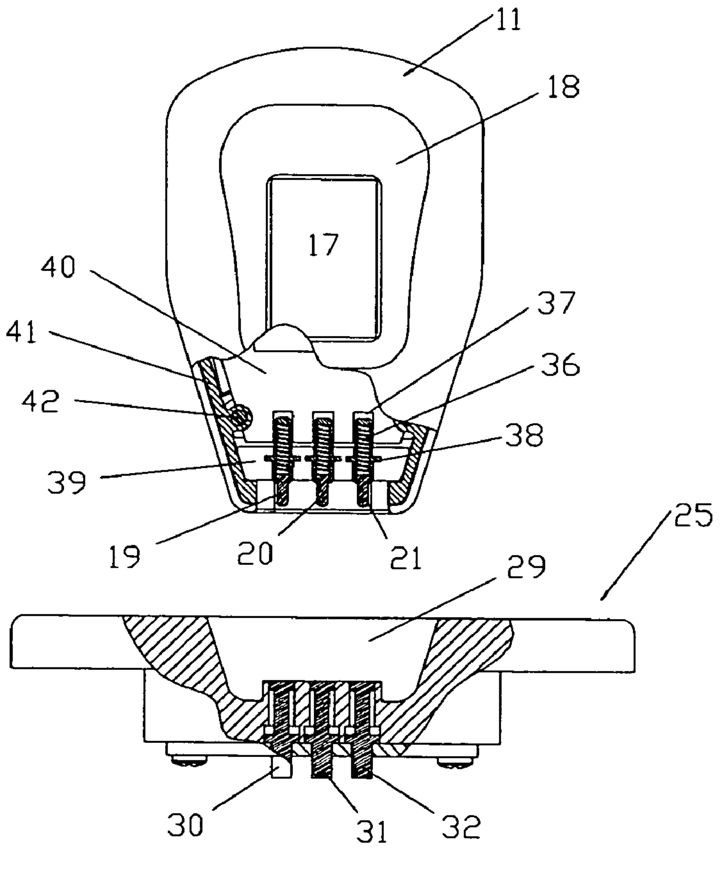

In FIGS. 8 to 9 the key 10 is shown oriented in an aligned relationship with door controller receptor 25 with contact pins 19, 20 and 21 about to abut corresponding stationary contacts 30, 31 and 32. Each of contact pins 19, 20 and 21 are provided with an inward bias by springs 36 upon touching contacts 30, 31 and 32. Each contact pin 19, 20 and 21 is retained within a retaining socket 37 and each socket 37 is provided with a retaining flange 38 for retention with an adjacent recess (not shown) of peripheral end part 39 of body 11. There is also shown circuit board 40 located in hollow compartment 41. There are also provided attachment apertures 42 for fasteners (not shown) for retention of circuit board 40 within compartment 41.

Figure 10:
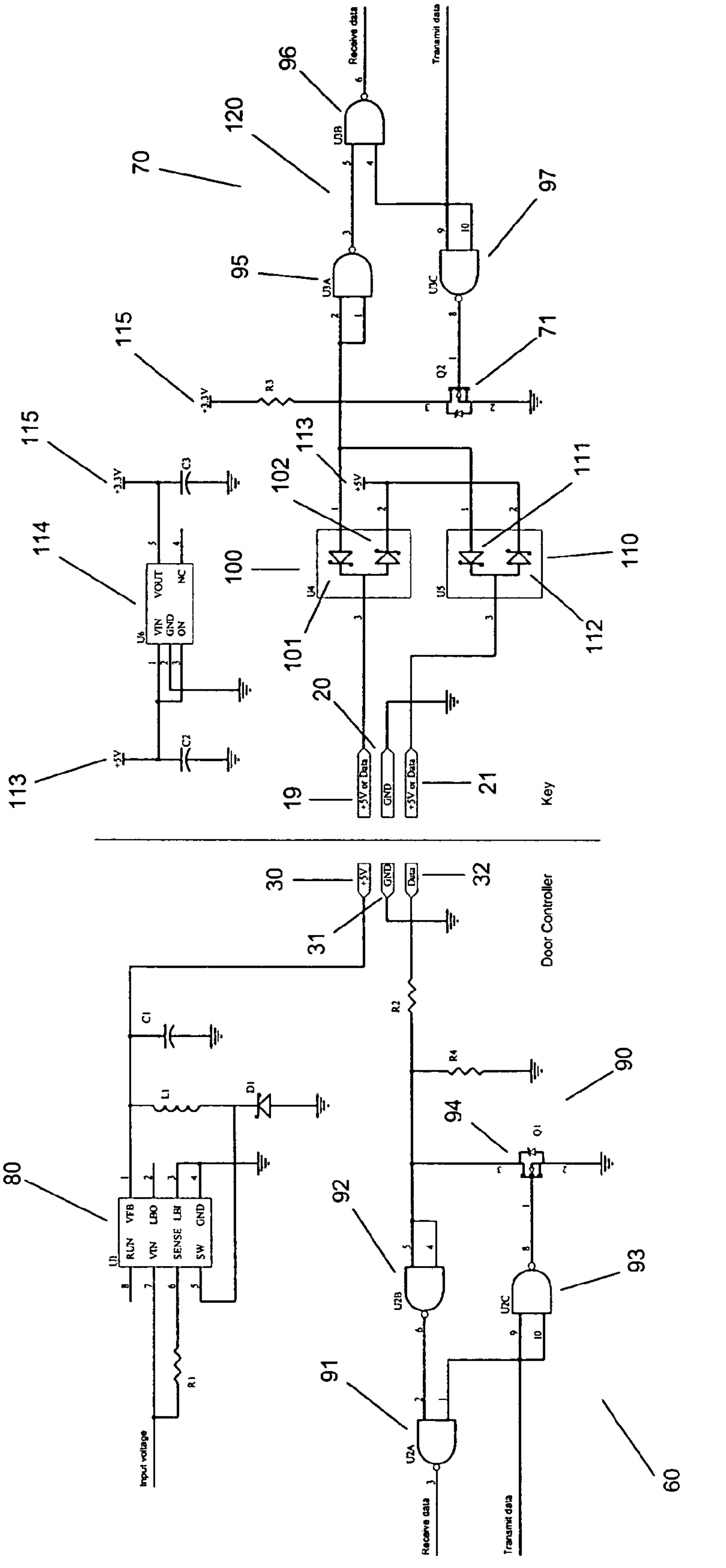
FIG. 10 is a view of the circuit in regard to both the biometric key of FIGS. 1 to 4 and the door controller receptor of FIGS. 5 to 7.

In FIG. 10 there is shown an overall circuit 50 which comprises a door controller circuit 60 and a key circuit 70. The door controller circuit 60 includes a power supply 80 and a door receive/transmit circuit 90. The power supply 80 is electrically connected to stationary contact 30, the door receive/transmit circuit 90 is electrically connected to stationary contact 32 and stationary contact 31 is connected to ground. The key circuit 70 includes power/data circuits 100 and 110 and a key receive/transmit circuit 120. The power/data circuit 100 is electrically connected to key contact 19, the power/data circuit 110 is electrically connected to contact 21 and contact 20 is connected to ground. Power/data circuit 100 includes device U4 having diodes 101 and 102 and power/data circuit 110 includes device U5 having diodes 111 and 112. Diodes 101 and 111 are in electrical communication with a key receive/transmit circuit 120 and diodes 102 and 112 are in electrical communication with a key 5V power supply 113.

The power supply 80 incorporates an LTC1474-5, which is a step down converter that ensures a constant 5 volt power supply. The power supply 80 also incorporates a 0.1 ohm resistor R1, which serves to program power supply 80 to deliver no more than 200 milliamperes to key circuit 70, thereby protecting both door controller circuit 60 and key circuit 70 from short-circuit-induced overload.

The door receive/transmit circuit 90 incorporates a SN74 ACOON chip which has four two input nand gates with only three nand gates 91, 92 and 93 being utilised. Also incorporated into receive/transmit circuit 90 are 100 ohm resistor R2 and 10K ohm R4 as well as switch 94 which is a HEXFET MOSFET model IRLM 2803.

The key circuit 70 incorporates chips of a similar type to the door controller circuit 60 being an SN74 A COON chip having four two input nand gates, with only three nand gates 95, 96 and 97 being utilised. The key circuit 70 also includes a switch 71 of similar type to switch 94. There is also shown 1 Kohm resistor R3.

In use when key 10 is inserted into door controller receptor 25 each of contacts 19, 20 and 21 touch mating contacts 30, 31 and 32. Thus when contacts 19 and 30 abut and contacts 21 and 32 abut power is therefore transmitted to key circuit 70 from power supply 80 with diode 101 preventing current from the 5V supply flowing into key receive/transmit circuit 120. Simultaneously diode 102 allows power to be supplied to key circuit 70.

At the same time the key power 5V supply 113 is converted by suitable means such as a linear or switching voltage regulator 114 to a 3.3 voltage supply 115 whereby current is supplied through contact 21 to contact 32 to nand gate 92. This means that a door controller microprocessor (not shown) which is incorporated into the door controller circuit 60 receives a signal indicating that key 10 has been inserted into the door controller receptor 25. When the key 10 has been inserted the resistor R3 raises the voltage on contact 32 from logic zero to logic 1, a state that is propagated to the door controller microprocessor through gates 92 and 91. The state of logic zero is maintained in the absence of the key 10 by pull-down resistor R4.

When the connection has been established between key 10 and the controller receptor 25, binary communication can begin. When the switch 71 closes, a short circuit is created between resistor R3 and ground which prevents current flowing from the 3.3 voltage power supply 115 to the door controller circuit 60 and hence creating a signal that can be interpreted by the door controller 60 circuit as a logic zero signal. When the switch 71 is open, current flows from the 3.3 voltage power supply 115 to the door controller circuit 60, which is interpreted by the door controller circuit 60 as a logic one signal.

The nand gates 91, 92, 93, 95, 96 and 97 control the multiplexing and demultiplexing of signals. Further, nand gates 91, 92 and 93 prevent the door controller circuit 60 from mistaking data that has been transmitted by the door controller 60 for data transmitted by the key circuit 70 and nand gates 95, 96 and 97 prevent the key circuit 70 from mistaking data that has been transmitted by the key circuit 70 for data that has been transmitted by the door controller circuit 60. This communication process is coordinated by the microprocessor that is incorporated into the door controller circuit 60 and a microprocessor (not shown) that is incorporated into the key circuit 70.

The door controller circuit 60 transmits data after it has received a packet of data from the key circuit 70. When the switch 94 opens, the voltage at a pair of inputs for the nand gate 95 is approximately 3 volts, which is interpreted by the key receive/transmit circuit 120 as a logic one. When the switch 94 is closed the voltage of inputs of the nand gate 95 is lowered to approximately 0 volts, which is interpreted as a logic zero by the key receive/transmit circuit 120.

When the key 10 is inverted, or rotated 180°, contacts 19, 20 and 21 abut contacts 32, 31 and 30, respectively. When the contacts are arranged in this fashion diode 111 prevents current from the door power supply 80 entering the key receive/transmit circuit 120. A key operator (not shown) who is left handed can hold the biometric key 10 in a first orientation and a key operator (not shown) who is right handed can rotate the biometric key 10 by 180° before inserting the biometric key 10 into the door controller receptor 25 in a second orientation. When the key 10 is inserted into door controller receptor 25 data signals can travel via diode 101 in the manner described above.

When the biometric key 10 is inserted into the door controller receptor 25 there is an initial communication between the devices before the key microprocessor (not shown) attempts to acquire biometric data from a key operator (not shown) via the sensor 17. It is best practise that a key operator (not shown) holds the biometric key 10 in such a fashion that their thumb is pressed against the sensor 17 to allow the sensor to acquire appropriate biometric data. When the identities of the key operator and the biometric key 10 have been determined and certified the door controller receptor 25 can operate a lock (not shown) and provide access to a secure environment.

Figure 11:
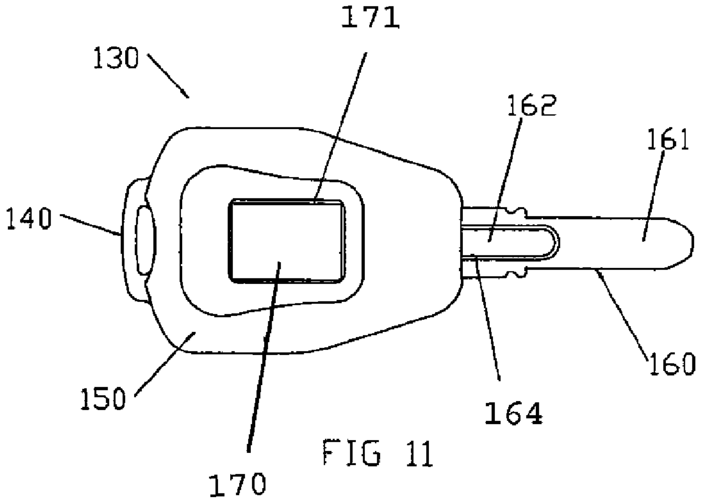
FIGS. 11 and 12 show front and back views, respectively, of a second embodiment of the biometric key of the invention.
Figure 12:
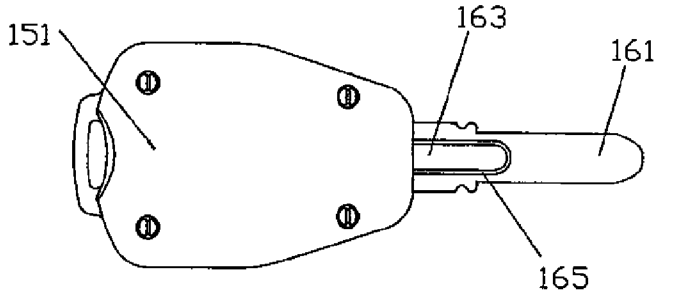

Referring to FIGS. 11 and 12, there is shown a second embodiment of a biometric key 130 that incorporates a body 140, a front surface 150, a rear surface 151 and a key blade 160. The front surface 150 includes a sensor 170 situated in a recess 171. The key blade 160 incorporates an earth 161, a contact 162, a contact 163 and insulation means 164 and 165.

The key circuit 70 is situated within the body 140 of the biometric key 130. A person skilled in the art would appreciate that the key circuit 70 can be electrically connected to contacts 162 and 163 in a manner similar to that in which the key circuit 70 is electrically connected to contacts 19, 20 and 21. The power/data circuit 100 is electrically connected to contact 162 and the power/data circuit 110 is electrically connected to contact 163. Contact 161 is electrically connected to ground.

Figure 13:
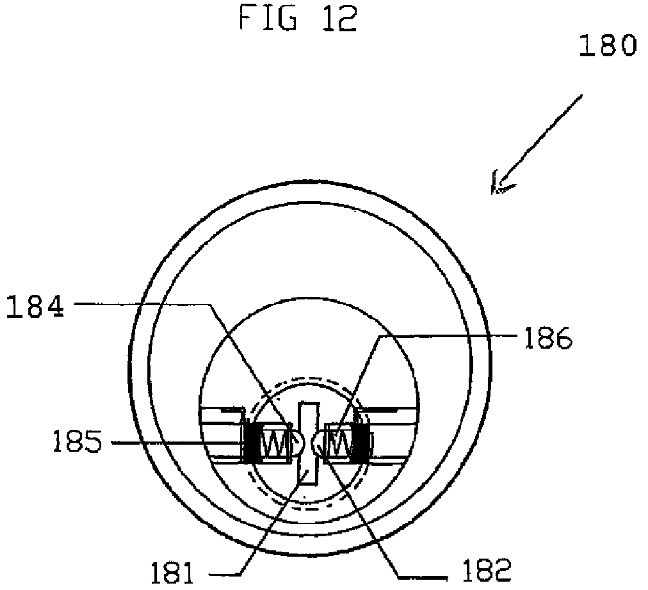
FIG. 13 shows a front view of a second embodiment of the door receptor of the invention.

Referring to FIG. 13, there is shown a key blade receptor 180, which incorporates an opening 181, standard lock mechanisms (not shown) and contact pins 182 and 184. Each of the contact pins 182 and 184 are provided with in inward bias by springs 185 and are retained within a retaining socket 186. Earth 161 contacts a corresponding earth contact (not shown).

The door controller circuit 60 is situated within the body 140 of the key blade receptor 180. The power supply 80 is electrically connected to contact pin 182 and the door receive/transmit circuit 90 is electrically connected to contact pin 184. A person skilled in the art would appreciate that the power supply 80 is connected to contact pins 182 and 184 in a fashion similar to the connection of the power supply 80 to the stationary contacts 30, 32 and 31 of the door controller receptor 25.

When the key blade 160 is inserted in a first orientation into the key blade receptor 180, the contacts 162 and 163 abut contact pins 182 and 184 respectively. When the key blade 160 is rotated 180° and inserted in a second orientation into the key blade 180 the contacts 162 and 163 abut contact pins 182 and 184, respectively. Therefore, the biometric key 130 can communicate successfully with the door regardless of the orientation with which the key blade 160 is inserted into the key blade receptor 180.

During the insertion and removal of the key blade 160 into and from the key blade receptor 180, the contacts 162 and 163 can make contact with contact pins 182 and 184 in a manner that results in the creation of short circuits. The current limiting of power supply 80 via R1, and the short circuit protection provided by R2, protect circuit 50 from damage that may result from the short circuits. When the key blade 160 is completely inserted into the key blade receptor 180 the insulation means 164 and 165 ensure that there are no short circuits between the contacts 161 and 163 and the contact pins 182 and 184.

Hence, the system and apparatus of the present invention provides a solution to the problem of maintaining polarity of connections and the problem of shorting of electrical contacts in biometric keys by virtue of the circuitry in the biometric key. This circuitry solves these problems without cumbersome electromechanical means.

The key of the invention can thus be inserted into a door receptor in different orientations, independent of the alignment of the electrical contacts on the key and the electrical contacts on the door. These advantages allow the biometric key to be used by right and left handed individuals and can also ensure that a lock can be operated quickly and easily.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A biometric key comprising a housing and a biometric sensor, a key circuit, and a plurality of electrical contacts connected to the housing wherein:

the key circuit incorporates a power supply circuit and a communications circuit;

at least two of the plurality of contacts are in electrical communication with the power supply circuit;

the communications circuit is in electrical communication with at least two of the plurality of contacts;

at least two of the plurality of contacts can transmit and receive data, enabling the biometric key to be received in a receptor in a first configuration or a second configuration inverted relative to the first configuration such that the biometric key can be inserted into the receptor in either of the two configurations to provide access to a facility;

wherein the biometric sensor reads biometric data from a key operator;

wherein the receptor has a plurality of mating contacts;

wherein the receptor incorporates a receptor circuit that incorporates a power supply and a communications circuit; and wherein the communications circuit comprises an arrangement of a plurality of 2-input nand gates and a switch, wherein communication data is electrically communicated to both inputs of a first nand gate, an output of the first nand gate is electrically connected to an input of a second nand gate, both inputs of a third nand gate are electrically connected to a second input of the second nand gate, the output of the second nand gate provides a received data signal and a transmitted data signal is provided to both inputs of the third nand gate.

2. The biometric key of claim 1, wherein at least two of the plurality of contacts are attached to diode circuits, where a first contact is connected to an anode of a first diode and to a cathode of a second diode, and a power supply is connected to a cathode of the first diode and the communications circuit is connected to an anode of the second diode.

3. The biometric key of claim 1, wherein the biometric key incorporates a microprocessor.

4. The biometric key of claim 1, wherein the biometric key has three contacts.

5. A biometric key comprising a housing and a biometric sensor, a key circuit, and a plurality of electrical contacts connected to the housing wherein:

the key circuit incorporates a power supply circuit and a communications circuit;

at least two of the plurality of contacts are in electrical communication with the power supply circuit;

the communications circuit is in electrical communication with at least two of the plurality of contacts;

at least two of the plurality of contacts can transmit and receive data, enabling the biometric key to be received in a receptor in a first configuration or a second configuration inverted relative to the first configuration such that the biometric key can be inserted into the receptor in either of the two configurations to provide access to a facility; and the communications circuit comprises an arrangement of a plurality of 2-input nand gates and a switch, wherein communication data is electrically communicated to both inputs of a first nand gate, an output of the first nand gate is electrically connected to an input of a second nand gate, both inputs of a third nand gate are electrically connected to a second input of the second nand gate, the output of the second nand gate provides a received data signal and a transmitted data signal is provided to both inputs of the third nand gate.

6. The biometric key of claim 1, wherein the receptor has three mating contacts.

7. The biometric key of claim 1, wherein both the contacts of the biometric key and the mating contacts of the receptor can transmit and receive data.

8. The biometric key of claim 1, wherein the receptor incorporates a microprocessor.

9. The biometric key of claim 1, wherein the receptor incorporates a first resistor such that the resistor limits the power supply to supply only power levels that will not damage the receptor circuit or the key circuit.

10. The biometric key of claim 1, wherein the receptor incorporates a second resistor such that the resistor provides short circuit protection for the key circuit and/or the receptor circuit.

* * * * *